Feb. 11, 1969     U. LINSI     3,427,083
RADIAL PLAIN BEARING FOR HIGH-SPEED TURBO-MACHINES
Filed June 9, 1966
Fig. 1
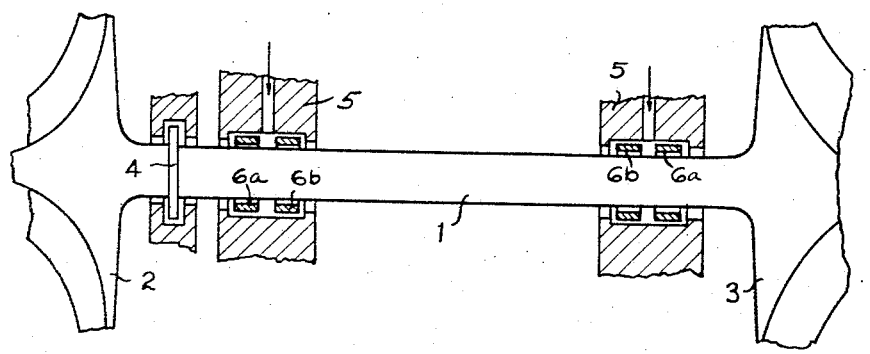
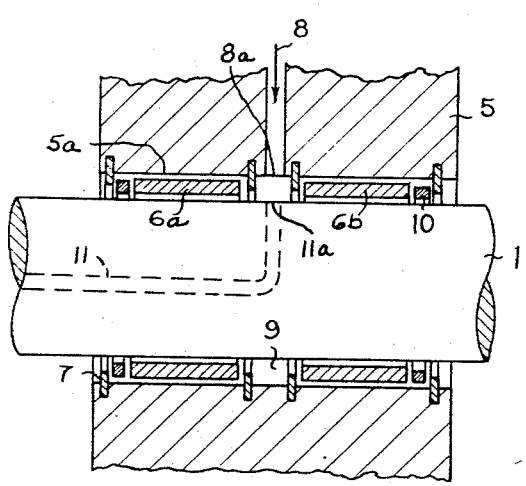
Fig. 2
INVENTOR.
Ulrich Linsi
BY
Pierce, Scheffler + Parker
Attorneys United States Patent Office 3,427,083
Patented Feb. 11, 1969

3,427,083
RADIAL PLAIN BEARING FOR HIGH-SPEED TURBO-MACHINES
Ulrich Linsi, Zurich, Switzerland, assignor to Aktiengesellschaft Brown, Boveri & Cie, Baden, Switzerland, a joint-stock company
Filed June 9, 1966, Ser. No. 556,441
Claims priority, application Switzerland, June 29, 1965, 9,058/65
U.S. Cl. 308—122      4 Claims
Int. Cl. F16c *1/24, 33/66, 13/02*

ABSTRACT OF THE DISCLOSURE

A radial plain bearing structure for supporting the rotor shaft of a high-speed turbo-machine comprises a bearing housing surrounding a part of the rotor shaft and a freely rotatable runner bush structure which surrounds the shaft and floats in the annular space between the shaft and bearing housing. The runner bush structure is comprised of two or more undivided bush rings between which lubricating oil is forced and the bush rings are free to rotate independently of each other.

---

The invention relates to a radial plain bearing for high-speed turbo-machines with a floating runner bush in the bearing housing.

There are known radial plain bearings wherein there is a runner bush between the shaft and the bearing housing, which bush has a certain amount of play with respect to both these components, and can therefore rotate freely. It is called a "floating bush." The speed of this bush sets itself automatically so that the frictional moment in the outer and inner bearer surfaces is of equal magnitude. Since the friction depends on the amount of bearing play, this determines the ratio of bush speed to shaft speed. For example, if the inner play between the shaft and the bush is kept constant, and the outer play between the bush and the bearing housing is increased, there is an increase in bush speed, which is always lower than the shaft speed. The advantage of this construction resides above all in that with a given speed and a given shaft diameter the sliding speed in both bearing gaps is lower than in the case of a normal plain bearing with a stationary bush. Furthermore, with equal play per bearing gap the total play is about twice as great as in a conventional plain bearing. This is particularly important in the case of light, high-speed rotors, in which the out-of-balance forces may be greater than the actual weight. The large amount of bearing play then allows the shaft to rotate about its gravitational axis.

However this kind of bearing exhibits various disadvantages: In consequences of unavoidable inaccuracy in production, the center of gravity of the running surface is not disposed exactly in the center of its inner bore. The effect of this essentially is that the bush does not run exactly centrally with respect to the axis of the shaft. This sets up pulsating forces which act on the shaft, and it runs roughly. The lubricating oil is fed through the shaft or from outside to one bearing gap, and through radial bores in the bush to the other. If the oil is introduced through the hollow shaft, sealing difficulties arise, and there is the danger that the hollow space in the shaft will be blocked by centrifuged dirt. If the feed takes place from outside, fairly high oil-pressure is necessary in order to ensure that the inner bearing gap is supplied through the bores against centrifugal action. If the oil is fed from outside into the space between the two bearings, it is set in rotation by the shaft running in it, which leads to an undesired increase in frictional power, and makes it more difficult to lubricate the inner bearing gap.

The present invention is based on the problem of improving the running characteristics of a bearing with a floating runner bush, while avoiding the disadvantages described. According to the invention, this is achieved as a result of the fact that the runner bush is divided in at least one radial plane into two or more bush rings which themselves are undivided and the ring parts thus produced rotate freely in the bearing housing independently of one another when in operation.

An example of embodiment of the invention is diagrammatically illustrated in the drawing, wherein
FIGURE 1 shows a shaft bearing, and
FIGURE 2 the design of a bearing on a larger scale.
The same components bear the same reference numbers.

The shaft 1, upon which the rotors 2, 3 of a flow machine are freely arranged, has two bearings. The shoulder 4 prevents it from moving axially. Each bearing is comprised of the housing 5 having a cylindrical bearing surface 5a and the two-piece floating bush consisting of the axially spaced undivided bush rings 6a located within the outer cylindrical bearing surface 5a. Seeger rings 7 are incorporated in order to hold the parts of the bush in the correct position axially, the said parts being advantageously of the same width. The lubricating oil is introduced through channel 8 in the bearing housing 5 and discharges through outlet 8a directly into the space 9 between the two bush rings 6a, 6b, which are forced axially apart by the oil pressure. As is evident from an inspection of FIG. 2, the axial distance between the rush rings 6a, 6b is substantially less than the axial length of either ring, and the two rings are of substantially the same axial length. Since the Seeger rings do not have an accurately machined surface, the parts of the bush sliding on them would be subject to wear. Contact rings 10 are accordingly also provided in known manner, having a certain amount of play with respect to both the shaft and the bearing housing, and being capable of free movement.

It is naturally also possible to introduce the oil through the shaft into the space 9 between the parts of the bush as indicated by shaft bore 11 which terminates in an outlet 11a between bush rings 6a, 6b. In addition, any bush may be comprised of more than two bush rings disposed side-by-side.

In the bearing construction described, the play between the bush and the shaft, and between the bush and the bearing housing is never exactly equal in the case of all parts of a bush belonging to a bearing because of inaccuracy in production; the speed of the individual parts of the bush will accordingly also be different. Their unbalance can accordingly act only transitorily in the same direction, and the disturbing forces which would put the shaft out of position can add only briefly. On the average, there is far less disturbance to smooth running of the shaft than in the case of an undivided bush. In the same way, a bush consisting of a plurality of, and accordingly narrower, rings is better suited to adapting itself to a shaft which has been bent by a large amount of unbalance.

In certain speed ranges, the oil film in plain bearings can set up oscillation in the shaft. However, since the individual rings of the bush are not running at exactly the same speed, these disturbances do not occur simultaneously in all rings. In practice, one or more parts will always be working correctly.

Uniform lubrication of the outer and inner bearing gaps is ensured by the fact that the parts of the bush are narrower, and also by the small volume of the space between them, which prevents the shaft from imparting any substantial amount of rotation to the oil.

I claim:
1. In a multiple bearing arrangement supporting a rotor shaft of a high-speed turbo-machine at at least two axially spaced locations along the shaft by radial plain bearings, the improvement wherein each said bearing comprises a bearing housing including a cylindrical surface surrounding an appertaining part of said shaft and a runner bush surrounding said shaft and located in the annular space between the surface of said shaft and said cylindrical surface of said bearing housing, said runner bush being constituted by at least two axially spaced undivided and floating bush rings which are freely and independently rotatable, the axial spacing between said bush rings being substantially less than the axial length of said bush ring, and means including an oil feed channel having a discharge outlet introducing lubricating oil under pressure directly into the axial space between said bush rings.

2. A radial plain bearing structure as defined in claim 1 wherein said bush components are of substantially the same axial width.

3. A radial plain bearing structure as defined in claim 1 wherein said means introducing lubricating oil directly into the axial space between said bush rings is constituted by a channel through said bearing housing and which terminates in an outlet at the cylindrical surface thereof and between said bush rings.

4. A radial plain bearing structure as defined in claim 1 wherein said means introducing lubricating oil directly into the axial space between said bush rings is constituted by a bore in said shaft which terminates in an outlet at the shaft surface between said bush rings.

References Cited
UNITED STATES PATENTS

| | | |
|---|---|---|
| 1,643,760 | 9/1927 | Allen. |
| 2,832,652 | 4/1958 | Comstock _____ 308—121 |
| 3,058,787 | 10/1962 | Bernson. |
| 3,096,126 | 7/1963 | Woollenweber et al. ____ 308—9 |
| 2,471,187 | 5/1949 | Atwater. |
| 2,929,548 | 3/1960 | Crooks et al. |
| 3,044,683 | 7/1962 | Woollenweber. |

FOREIGN PATENTS 262,973      Great Britain.

MARTIN P. SCHWADRON, *Primary Examiner.*

FRANK SUSKO, *Assistant Examiner.*